Feb. 23, 1960 W. T. HEASLIP 2,925,970
RETRACTABLE AIRCRAFT LANDING ELEMENT MOUNTING
Filed Nov. 6, 1953 5 Sheets-Sheet 1

Inventor
WILLIAM T. HEASLIP
By~ Fetherstonhaugh&Co.
Attys

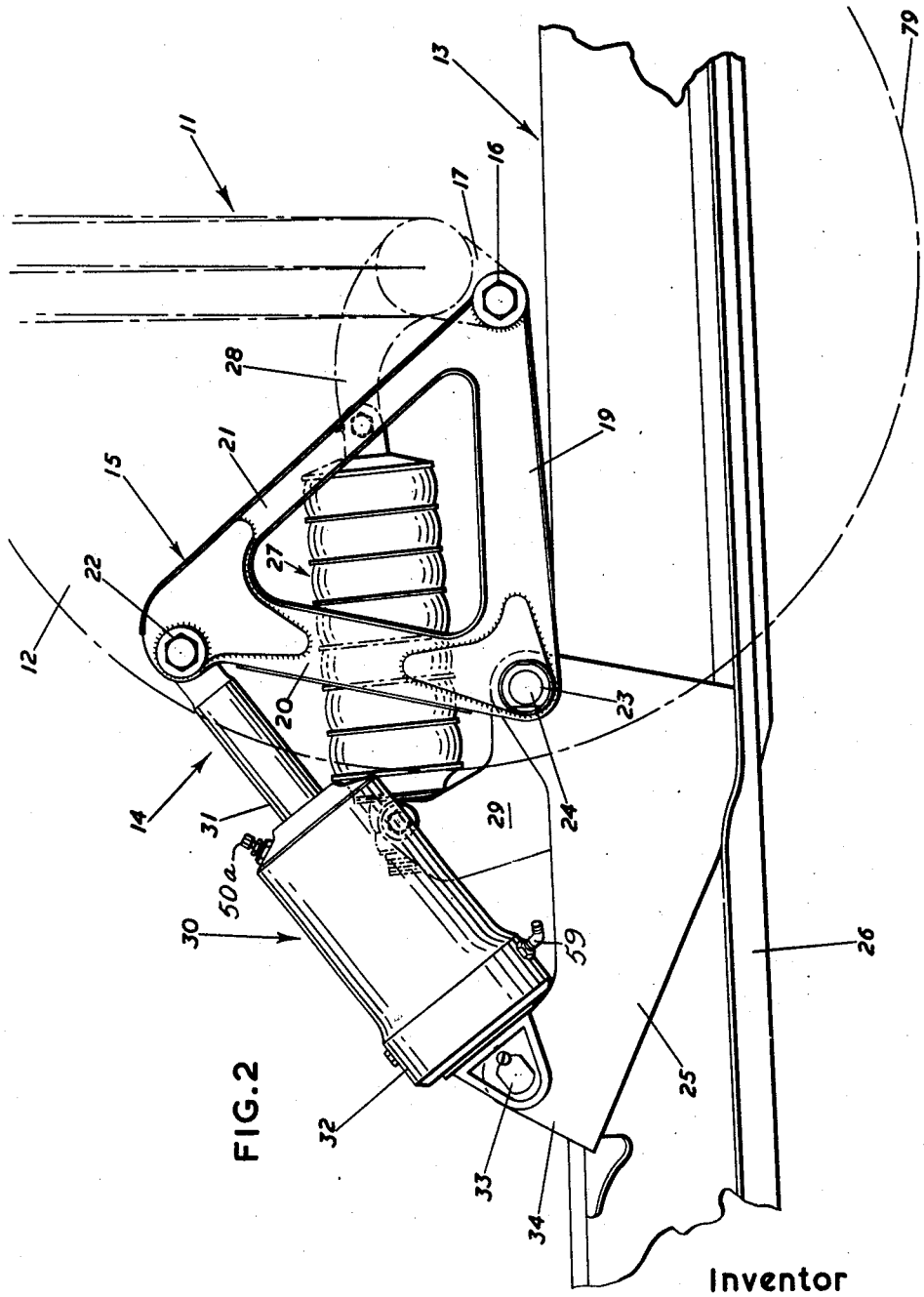

Feb. 23, 1960  W. T. HEASLIP  2,925,970
RETRACTABLE AIRCRAFT LANDING ELEMENT MOUNTING
Filed Nov. 6, 1953  5 Sheets-Sheet 3
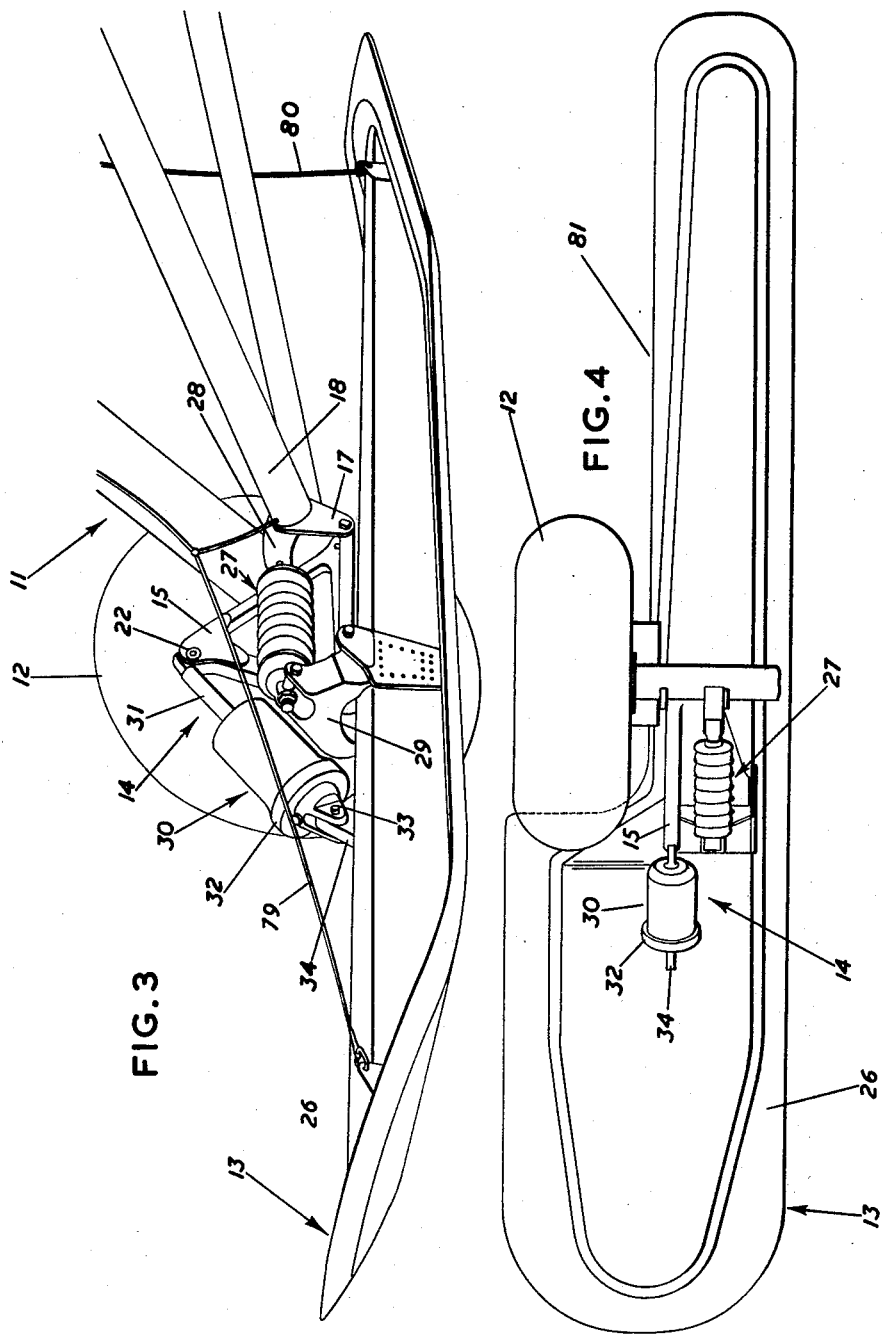
Inventor
WILLIAM T. HEASLIP
By~ Fetherstonhaugh Co.
Atty's

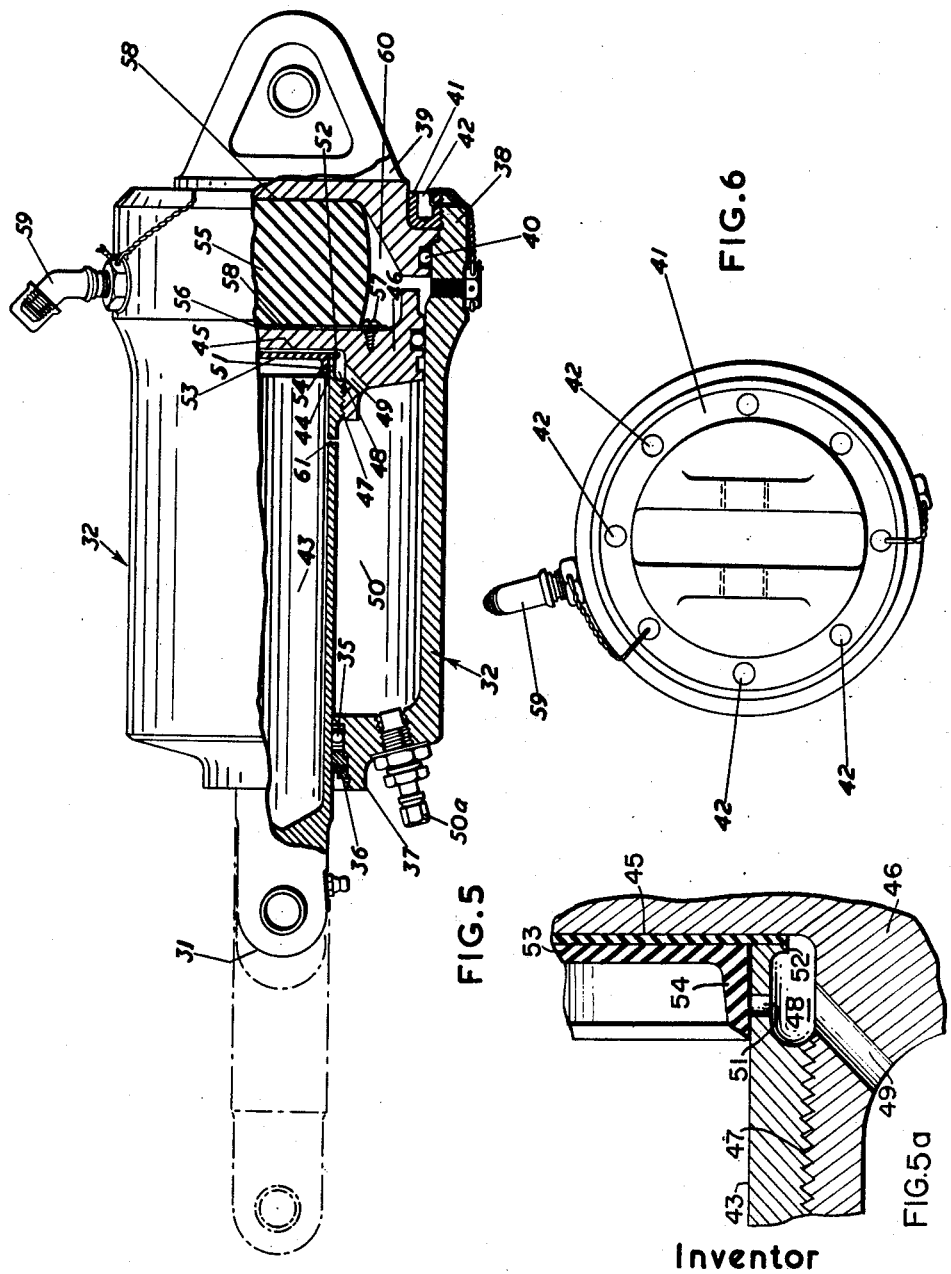

Feb. 23, 1960 W. T. HEASLIP 2,925,970
RETRACTABLE AIRCRAFT LANDING ELEMENT MOUNTING
Filed Nov. 6, 1953 5 Sheets-Sheet 5

Inventor
WILLIAM T. HEASLIP
By~ *Fetherstonhaugh & Co.*
Att'ys

United States Patent Office 2,925,970
Patented Feb. 23, 1960

2,925,970
RETRACTABLE AIRCRAFT LANDING ELEMENT MOUNTING

William T. Heaslip, Wilson Heights, Toronto, Ontario, Canada, assignor to The de Havilland Aircraft of Canada Limited, Toronto, Ontario, Canada Application November 6, 1953, Serial No. 390,689

4 Claims. (Cl. 244—108)

This invention relates to a retractable self-trimming shock absorbing mounting for aircraft landing elements such as ski, pontoon, endless track or like landing elements, having a rigid ground- or water-contacting portion of considerable length.

The landing element mounting of the invention is more especially adapted for use with a ski to retract or extend the latter relative to the wheels of the landing gear of aircraft, while accomplishing an equivalent shock absorbing effect as a tired wheel when the ski or other landing element is in the extended position.

Prior ski retracting mountings, when combined with aircraft landing wheels, involve complexity of construction in swinging the ski for positioning in a rearward or forward direction over a considerable distance to permit the wheel to rest upon the ski for a shock absorbing function. The large retractable movement of the ski thus necessary, involves complication in providing necessary ski trimming gear active at all positions of the ski.

In contrast, the invention has for its main object, the provision of a shock absorbing ski mounting which effects the desired retracting or extending adjustment within a relatively small range of movement of the ski or like landing element while avoiding the necessity of at any time contacting the wheel and the landing element for shock absorbing purposes by providing an effectively equivalent shock absorbing device in the mounting thereof.

Another object of the invention is to provide a retractable shock absorbing ski mounting containing a shock absorbing element active as a prime mover for retracting and extending the ski.

A further object of the invention is to provide a retractable shock absorbing ski mounting embodying an automatic trim device for maintaining the ski at desired trim angles in flight or on the ground during the full range of retractive positioning.

Other objects of the invention will be appreciated by a study of the following specification taken in conjunction with the accompanying drawings.

In the drawings:

Figure 2 is a view corresponding to Figure 1 but showing the ski in the retracted position as accomplished by the mounting device of the invention;

Figure 3 is an inside perspective view showing a ski mounted on a tired wheel aircraft landing gear assembly by the retractable mounting of the invention and showing the ski in the retracted position;

Figure 4 is a plan view of the assembly of Figure 3 in the extended position of the ski;

Figure 5 is an elevation of the actuator element of the retractable shock absorbing mounting of the invention showing a portion thereof removed to reveal the inner construction;

Figure 5a is an enlarged sectional fragmentary view to illustrate in enlargement the formation of the piston head structure as shown in Figure 5;

Figure 6 is an end view of the actuator of Figure 5;

Figure 1:
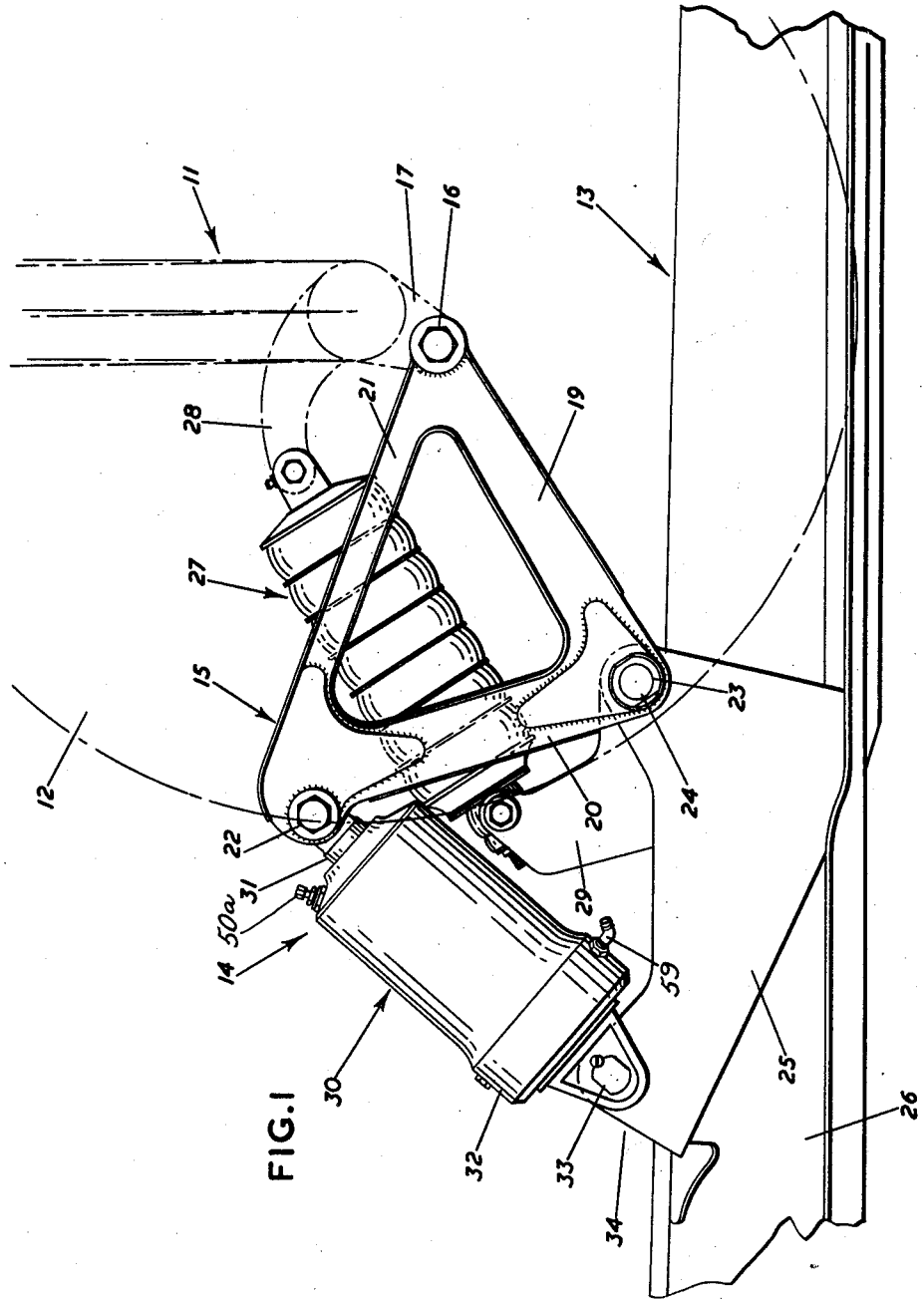
Figure 1 is an elevation of the mounting of the invention applied to a ski and landing gear combination of an aircraft.

Referring to the drawings and in particular, Figures 1 to 4 inclusive, an aircraft having landing elements in the form of landing gear 11 with wheels 12, has a supplementary landing element 13 mounted thereon by a retractable mounting device 14 of the invention.

The device 14 comprises a swingable pedestal link 15 pivoted as at 16 to a rigid mounting 17 projecting from the strut 18. The pedestal link includes the rigid suspension arm portion 19 from which extend the arms 20 and 21 terminating at the actuating fitting 22 forming a part of the generally triangular link. The other end 23 of the suspension arm 19 is pivotally connected as at 24 to the mounting plate 25 fastened securely to the supplementary landing element in the form of the ski unit 26. The ski is thus movable upwardly and downwardly on the effective radius of the suspension arm 19 about the pivot 16. The invention, however, contemplates a parallel arm suspension for substantially maintaining the ski at a predetermined angular relation to the aircraft, i.e., at about right angle to the landing gear strut 18. For this purpose, a resilient arm 27 hereinafter referred to as a trimming unit, pivotally extends from an anchorage 28 on the strut 18 to pivotally connect at its other end to a bracket 29 extending rigidly from the ski 26. It will be apparent that in raising and lowering of the ski into and out of operative position, the latter will be maintained in angular relationship to the strut 18 by the swingable parallel motion suspension device described, one arm of which comprises rigid suspension arm 19, the other arm of which comprises the resilient trimming unit 27.

Upon an examination of Figure 2, it will be observed that the pedestal link 15 will rotate clockwise about the pivot 16 in this illustration as the ski 26 is raised. A shock absorbing actuator 30 is pivotally connected by its actuating rod 31 to the actuating fitting 22 of the pedestal link 15, the casing portion 32 thereof being pivotally anchored as at 33 to the bracket portion 34 of the ski mounting plate 25. The actuator 30 is normally biased to the closed or retracted position of the rod 31 under predetermined pre-compression and is actuated to the extended position shown in Figure 2 by an hydraulic system adapted to apply pressures sufficient to overcome the biasing pressure and to raise the ski.

The shock absorbing actuator is shown in more detail in Figures 5 and 6. The piston arm 31 is slidably mounted in the bearing 35 having an air sealing packing 36 in the end wall 37 of the cylindrical casing 32. The other end 38 of the casing is closed by a pivotally mountable base bracket 39 seated therein with a fluid sealing gasket 40 and retained in assembly therewith by the threaded retaining ring 41. Wrenching holes 42 are provided in the retaining ring by which the latter may be securely tightened in place.

The piston arm 31 has a bore 43, the open end 44 of which abuts the inner face 45 of the piston head 46 threaded thereto as at 47 to provide an annular chamber 48. A bore 49 communicates from an outer annular air chamber 50 to chamber 48 through a multitude of orifices 51 in the terminal flange 52 of arm 31 to the bore 43, the latter serving as a portion of the air chamber. A sealing cup 53 mounted on the inner face 45 of the head 46 has a deflectable flange 54 extending over the orifices 51.

A soft rubber bumper 55 is bonded to an end plate 56 fastened by screws 57 or other suitable means to the outer face 58 of the piston head 46.

In operation, the pneumatic chamber 50 including the bore 49 and chamber 48, is preloaded with compressed air through the valve fitting 50a, to a suitable biasing pressure greater than that sufficient to raise the aircraft to a position where the skis are fully extended below and clear of the wheels. At this point of operation, the bumper 55 will be in abutment under this pressure against the inner surface 58 of the base bracket 39. The ski is raised by passing hydraulic fluid under sufficient pressure through the inlet fitting 59 to the hydraulic chamber 60 to cause the piston arm to extend and thus actuate the pedestal link in the clockwise direction illustrated in Figure 2. As chamber 50 decreases in volume, air passes through orifices 51 to the bore 43 by deflecting the flange 54 of sealing cup 53. In the apparatus shown, the maximum compression ratio afforded is about 5 to 1 so that with a preloading biasing air pressure of say 250 pounds per square inch, the air pressures in chamber 50 at maximum extension of piston arm 31 may be about 1250 pounds per square inch.

When the ski is in the extended position as illustrated in Figure 1, the actuator components are positioned as shown in Figure 5, at which point of operation, the pressures in the hydraulic chamber 60 will be at sump or zero pressure and accordingly the preloading biasing pressure will resiliently support the aircraft. The shock absorbing function of the actuator is accomplished by the absorption of shock energy to still further compress air in the chamber 50 as the piston arm projects from the casing 32 to the extent necessary to absorb the energy by this means. Shock dampening is effected by the restriction imposed to the passage of air to the bore 43 by the orifices 51 and 61. Observe that the orifice 61 is free of the flange 54 of the sealing cup 53 and permits a relatively slow return of the actuator components to the biased position. If the sealing cup 53 is made of a rubbery plastic material having imperfect sealing qualities, the leakage may be satisfactory to accomplish the desired return stroke lag under biasing pressures without necessitating the use of the orifice 61. It will accordingly be apparent that shock or landing force energy is absorbed by compressing the air in the pneumatic chamber and that the expansion is restricted in some way to effect a time lag in the return of the components to the positions shown in Figures 2 and 5. The conventional hydraulic control systems are capable of supplying the hydraulic pressures required in the manner indicated. It should be noted, however, that when the ski is extended, the hydraulic pressure may be zero so that failures in the hydraulic circuit of the aircraft will not affect operation of the actuator of the invention except to the extent that the ski may not be retractable.

Figures 7, 8:
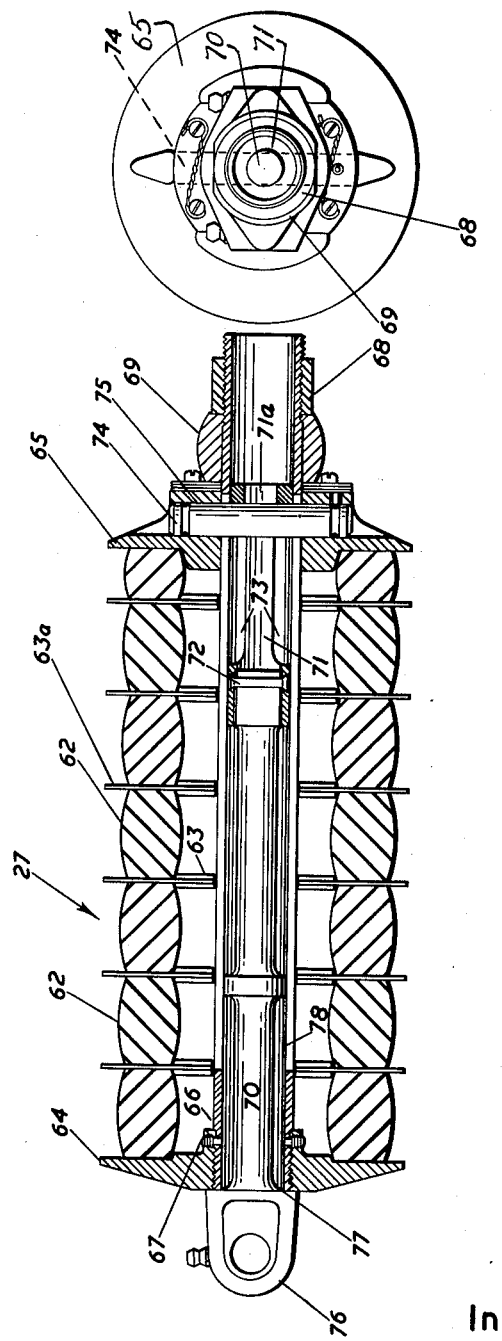
Figure 7 is a sectional view of the trimming component or unit of the retractable shock absorbing mounting of the invention.
Figure 8 is an end view of the trimming unit of Figure 7.

The double acting resilient member or trim unit 27, shown in more detail in Figures 7 and 8, embodies preloaded double acting compressible means comprising the compressible annular bodies or rings 62 supported on the shoulder rings 63 of spacers 63a compressed in assembly by end brackets or flanges 64 and 65. The bracket 64 is fixed to one end of the mounting tube 66 as at 67 whereas the bracket 65 is slidably mounted on the other end of the tube. The components are held in assembly under desired compression preloading by tightening the screw threaded collar 68 down upon the retaining slidable trunnion 69. A mounting rod 70 slidably extends through the tube 66 to connect to an actuating sleeve 71 therein by a pin 72. The sleeve 71 is slotted as at 73 over a portion of its length corresponding to the maximum desired movement in the trim unit. An actuating bar 74 passes transversely through the slot 73 to seat in a transverse bore 75 in the bracket 65. A pivotally mountable head 76 forms the other end of the rod 70 and carries a retaining shoulder 77 adapted to engage the bracket 64 under compressive loads.

In operation, the trunnion swingably connects in anchorage 28 of Figures 1 and 2 whereas the head 76 pivotally connects to the bracket 29 of the ski 26. Under an impact load, the shoulder 77 of the head 76 engages bracket 64 and trunnion 69 and bracket 65 slidably moves over the tube 66 toward the bracket 64 further compressing rings 62 while actuating bar 74 rides in slot 73. Under a tensile load between head 76 and trunnion 69, the latter engages collar 68, thus pulling bracket 64 on tube 66 while the terminus 71a of the actuating sleeve 71 engages the actuating bar 74 permitting head 76 to exert a pull thereon. The actuating bar 74 may move longitudinally of the tube 66 by reason of the longitudinal slots 78 in the latter. It will therefore be seen that the trim unit responds resiliently to compressive or tensile loads by compressive deflection of rings 62 and for this reason, is referred to as "double acting." The unit is preferably preloaded so that loads encountered during flight are insufficient to unduly disturb the selected flight trim of the ski.

Ground loads applied to the ski, however, are of greater magnitude and produce length changes in the trimmer unit as required to permit the ski to follow the irregularities of the ground. By providing suitable trim cords 79 and 80 (Figure 3), the extent of the ground trimming can be restricted to any desired amount. The restraining feature of the unit is confined to installations where the undercarriage design is such as to cope with the restraining loads so produced.

As before mentioned, the shock absorbing actuator is also preloaded by virtue of the charging pressure of the air in the air chamber. This ensures that the actuator is not extended by the influence of external loads until the value of the preload is exceeded. The value of the preload is so selected that static load conditions on the ski are just supported through the linkage system without extension of the actuator. Under landing or taxiing conditions, however, where static loads are exceeded, extensions of the actuator are produced and the unit performs in a manner similar to conventional shock absorbers. The energy requirements of the undercarriage are thereby met without relying on the capacity of the tires.

As will be evident from Figures 3 and 4, the supplementary landing element or ski 26 is of special design in that an opening consisting of a cut-away portion 81 is provided therein to freely accommodate the wheel 12. However, the landing element mounting of the invention is not necessarily limited to use with a ski of the shape shown but is of general application where a retractable self-trimming shock absorbing device is required. Accordingly, it will be understood that the drawing and foregoing description disclose a specific preferred application and form of the invention from which obvious modifications may be devised by skilled persons without departing from the concept and spirit of the invention. Thus, it will be appreciated that in concept, the invention contemplates a mounting comprising a suspension device movable between predetermined limits and adapted to connect a landing element to an aircraft in consistent angular relation during flight wherein the suspension is preloaded to one limiting position while permitting actuation against such biasing preloading toward the other limiting position for retraction of the landing element in the preferred use of the invention as set forth herein.

What I claim as my invention is:

1. A mounting for connecting a landing element to an aircraft, comprising, in combination: a rigid arm pivotally connected at different ends thereof to an aircraft and a landing element; a double-acting resilient arm pivotally connected at opposed ends thereof to said landing element and said aircraft in substantially parallel spaced apart relation to said rigid arm and forming therewith a swingable suspension device capable of motion between predetermined, retracted and extended limits; an actuating link of variable length operable between extended and retracted limits, pivotally connected between said rigid arm and said landing element whereby the length of said actuating link controls the angle between said rigid arm and said landing element and thereby the position of said landing element, said actuating link being biased toward the limit position which places said landing element at its extended limit of motion with respect to said aircraft, and means remote from said link operable for moving said link to its other limit position against said bias whereby said landing element is moved to its retracted limit of motion relative to said aircraft.

2. A retractable shock absorbing mounting for connecting a landing element to an aircraft, comprising, in combination: a rigid pedestal link of generally triangular configuration having a suspension arm portion terminating at two apices thereof, and an actuating means attached to the remaining apex thereof; means pivotally connecting the terminal ends of said suspension arm to said aircraft and said landing element; an arm disposed in substantially parallel spaced apart relation to said suspension arm pivotally connected at its ends to said aircraft and said landing element for substantially parallel swinging motion with said suspension arm to provide substantially constant angular relation between said aircraft and said landing element during swinging motion of said arms between retracted and extended limits of motion of said landing element relative to the aircraft; said actuating means comprising: a piston chamber containing a rigidly connected piston and piston arm connected between said remaining apex and said landing element, said chamber on the side of said piston on which excess pressure will move said piston toward the retracted position, being filled with compressible fluid under sufficient pressure to so move the piston arm in the absence of excess pressure on the other side of said piston.

3. The combination with an aircraft having a landing element, of: a supplementary landing element; a parallel motion suspension device comprising two normally parallel arms, each pivotally connecting said supplementary landing element to said aircraft freely adjacent the landing element thereof; one of said arms having a limited resilience; a pneumatically preloaded shock absorbing device biasing said suspension and supplementary landing element under predetermined pressures to an extended position at which the supplementary element effectively replaces the landing element of the aircraft; and means for retracting said supplementary element on said suspension against the biasing pressure of said shock absorbing device by opposing said pneumatic preload.

4. A device as claimed in claim 1 wherein said actuating link comprises a piston cylinder, a piston movable in said cylinder attached to a piston rod, said piston being movable in said cylinder and, defining two chambers therein, a port for pneumatically charging the chambers wherein an excess of pressure causes the piston to assume the position corresponding to the extended position of said landing element, an hydraulic supply means operable from the cockpit of the aircraft connected to the chamber wherein an excess of pressure causes the piston to assume the position corresponding to the retracted position of said landing element.

References Cited in the file of this patent

UNITED STATES PATENTS

| | | |
|---|---|---|
| 1,463,654 | McNulty | July 31, 1923 |
| 1,613,842 | Mummert | Jan. 11, 1927 |
| 1,770,756 | Markey | July 15, 1930 |
| 1,892,064 | Markey | Dec. 27, 1932 |
| 2,106,934 | Saulnier | Feb. 1, 1938 |
| 2,186,235 | Brown | Jan. 9, 1940 |
| 2,315,098 | Simpson et al. | Mar. 30, 1943 |
| 2,532,610 | Ditter | Dec. 5, 1950 |
| 2,574,404 | Levy | Nov. 6, 1951 |

FOREIGN PATENTS

| | | |
|---|---|---|
| 485,617 | Great Britain | May 16, 1938 |
| 488,059 | Great Britain | June 30, 1938 |
| 526,116 | Great Britain | Sept. 11, 1940 |
| 533,076 | Great Britain | Feb. 6, 1941 |